(No Model.)
J. BROWN.
WRENCH.
No. 606,270. Patented June 28, 1898.
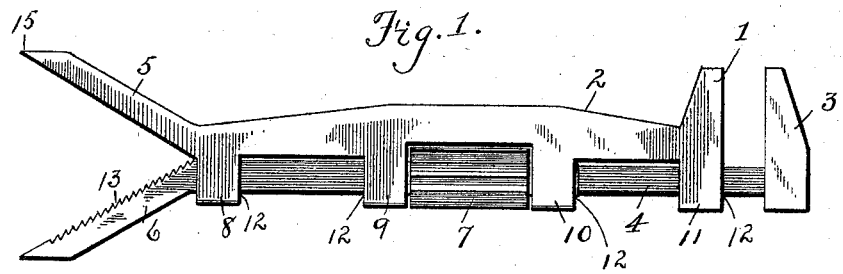
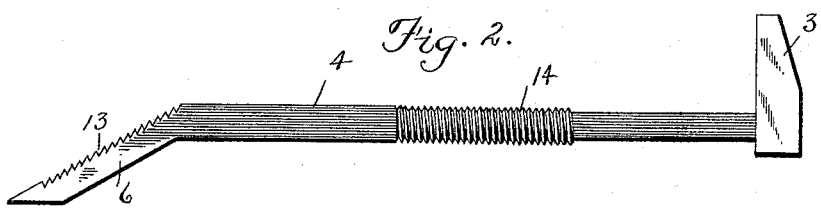
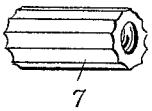
Witnesses
Lee I. Van Horn.
Victor J. Evans
Inventor
John Brown,
by John Wedderburn
Attorney

UNITED STATES PATENT OFFICE.

JOHN BROWN, OF CONNEAUT, OHIO.

WRENCH.

SPECIFICATION forming part of Letters Patent No. 606,270, dated June 28, 1898.

Application filed September 22, 1897. Serial No. 652,569. (No model.)

*To all whom it may concern:*

Be it known that I, JOHN BROWN, a citizen of the United States, residing at Conneaut, in the county of Ashtabula and State of Ohio, have invented certain new and useful Improvements in Wrenches; and I do hereby declare the following to be a full, clear, and exact description of the invention, such as will enable others skilled in the art to which it appertains to make and use the same.

This invention relates to improvements in wrenches, and has more particular relation to combined nut and pipe wrenches.

The invention consists of certain novel constructions, combinations, and arrangements of parts, all of which will be hereinafter more particularly set forth and claimed.

In the accompanying drawings, forming a part of this specification, Figure 1 represents a side view of the wrench embodying my invention. Fig. 2 represents a detail view of the sliding shank carrying the movable nut-jaw and the movable pipe-jaw. Fig. 3 represents a detail view of the operating-nut.

1 in the drawings represents the stationary nut-jaw; 2, the frame carrying the same; 3, the sliding nut-jaw; 4, the sliding shank; 5, the rigid pipe-jaw; 6, the sliding pipe-jaw, and 7 the adjusting-nut. Said frame 2 is provided at one end with a rigid pipe-jaw 5, which latter extends from said frame 2 at an angle. This frame is provided upon its side opposite the respective jaws 1 and 5 with four spaced lugs or projections 8, 9, 10, and 11. The shank 4 is adapted to be passed through rectangular apertures 12 12, formed in the respective lugs 8, 9, 10, and 11, and is provided at its lower end with a pipe-jaw 6, having a plurality of teeth 13 formed upon its inner face. The jaws 5 and 6 form alligator-jaws and lie upon opposite sides of the plane separating frame 2 and shank 4. Said shank 4 is also formed along a portion of its length with screw-threads 14 and is connected at its upper end with a sliding jaw 3, said connection being made after the shank has been placed in the apertures 12, with an adjusting-nut 7 in position thereon between said lugs 9 and 10. Said nut 7 is screw-threaded, so as to screw onto said shank 4 and is formed with a milled or fluted periphery.

It will be observed from the foregoing description that the rotation of said adjusting-nut 7 will cause the shank 4 to move longitudinally in relation to the frame 2 in either one direction or the other, and will thus separate the jaws 1 and 3 or bring the same closer together, as desired. This longitudinal movement of the shank 4 does not practically change the relation of the jaws 5 and 6, as the same always remain at the same angle to each other and may be instantly applied to a pipe, when so desired, in order to turn the same. I preferably reduce the ends of the pipe-jaws 5, as at 15, so that said reduced end may be employed as a screw-driver.

It will be observed from the foregoing description that my improved tool combines a nut-wrench, pipe-wrench, and screw-driver, and that none of the functions of any of these devices is impaired by its combination with the remainder of said devices, yet the whole forms a compact tool of great strength and rigidity.

The jaws 5 and 6 form an improved grip at the end of the handle, whereby an increased leverage may be secured when the nut-wrench portion is being employed. The peculiar structure of the jaw 6, with its inwardly and upwardly projecting teeth, also permits of the pipe being tightly clamped between said jaws 5 and 6 by moving the shank longitudinally after said jaws have been brought into contact with said pipe.

Having thus described my invention, what I claim as new, and desire to secure by Letters Patent, is—

1. In a wrench, the frame 2, having the rigid jaw 5, the shank 4 having the sliding jaw 6 provided with serrations 13, said jaws lying upon opposite sides of the plane separating the frame and the shank, and means for adjusting the shank longitudinally in relation to the frame, substantially as described.

2. In a nut and pipe wrench, the frame having at one end a nut-jaw and at the other end a pipe-jaw, a series of apertured lugs depending from the frame opposite the side thereof whereon the said jaws are situated, a shank seated in said lugs and having at one end a nut-jaw and at the other end a serrated pipe-jaw, said pipe-jaws forming alligator-jaws, and an adjusting-nut mounted between two of said lugs and on a screw-threaded portion of the shank, substantially as described.

In testimony whereof I have signed this specification in the presence of two subscribing witnesses.

JOHN BROWN.

Witnesses:
F. M. COLSON,
W. G. BUSS.